United States Patent [19]

Benz, Jr.

[11] 4,023,406

[45] May 17, 1977

[54] TIGHTENING SYSTEM WITH TORQUE-TIME CONTROL

[75] Inventor: John W. Benz, Jr., Ambler, Pa.

[73] Assignee: Standard Pressed Steel Co., Jenkintown, Pa.

[22] Filed: Mar. 31, 1976

[21] Appl. No.: 672,094

[52] U.S. Cl. .................................. 73/139; 73/88 F
[51] Int. Cl.² ........................................ G01N 3/22
[58] Field of Search ............... 73/88 F, 139; 173/12; 81/52.4 R

[56] References Cited

UNITED STATES PATENTS

| | | | |
|---|---|---|---|
| 3,643,501 | 2/1972 | Pauley | 73/88 F X |
| 3,693,726 | 9/1972 | Hornig et al. | 73/88 F X |
| 3,825,912 | 7/1974 | Wiese et al. | 73/88 F X |
| 3,962,910 | 6/1976 | Spyridakis et al. | 73/88 F |

*Primary Examiner*—Jerry W. Myracle

*Attorney, Agent, or Firm*—Andrew L. Ney; Aaron Nerenberg

[57] ABSTRACT

The invention disclosed herein relates to a tightening system including a wrench for applying torque to a fastener system. Associated with the wrench is a control system including measuring means for developing a first signal representative of the torque applied to the fastener. A second signal representative of a constant incremental time is introduced along with the torque signal into gradient calculating means which develops a signal representative of the slope of a torque-time curve which can be plotted for the particular fastener system being tightened. When the gradient signal falls to a predetermined percentage of the maximum previously stored gradient signal, at the yield point of the fastener system or some similarly significant point on the torque-time curve, a control signal is generated stopping the tightening of the fastener.

12 Claims, 2 Drawing Figures

U.S. Patent   May 17, 1977   4,023,406
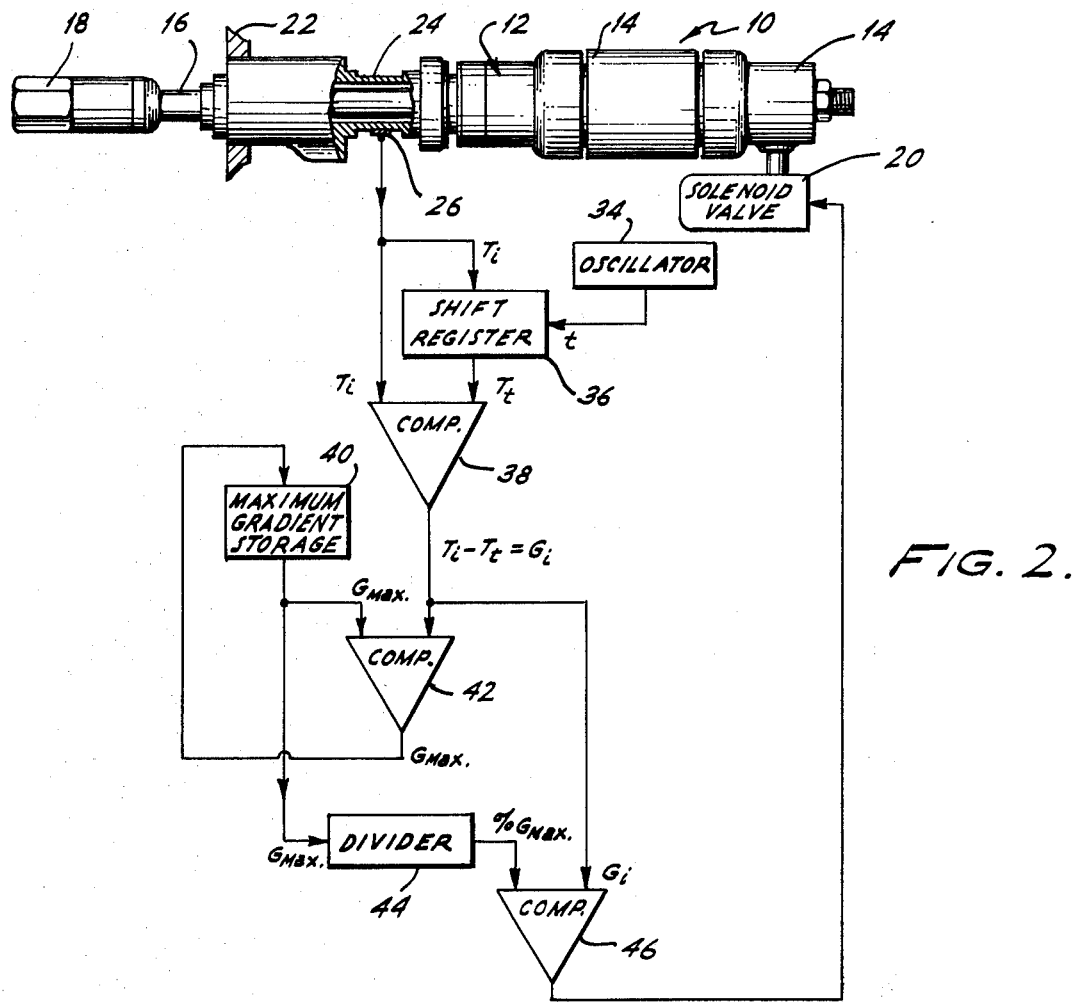
FIG. 2.
FIG. 1.
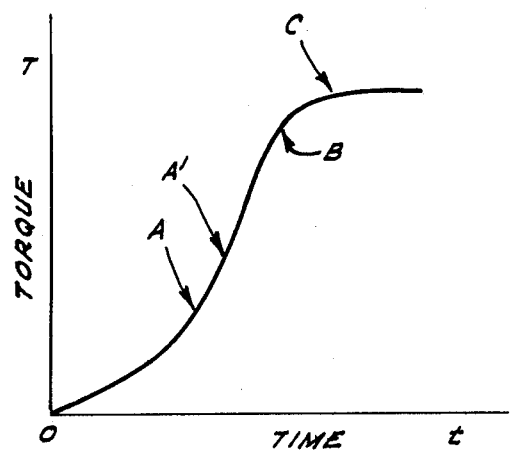

TIGHTENING SYSTEM WITH TORQUE-TIME CONTROL

BACKGROUND OF THE INVENTION

This invention relates generally to apparatus for tightening fastener systems and, more particularly, to apparatus for tightening fastener systems to the yield point or some similarly significant point characterized by a significant change in slope of the torque-time curve plotted for that particular fastener being tightened and corresponding to a predetermined axial load on the fastener.

In the design of structural joints secured by mechanical fastener systems, it is usual to provide for the fasteners to exert a predetermined clamping force or laod on the structural members in order to insure the integrity of the joint. When a joint is assembled, it is therefore desirable that the fasteners be tightened to exert a predetermined axial load on the associated structural members. However, many prior art tightening techniques for tightening threaded fasteners, such as nuts and bolts, to exert a predetermined load on associated structural members are not entirely satisfactory. For example, the most accurate tightening technique involves measuring the axial strain or stretch of the bolt while it is being tightened and relating the stretch to the stress or axial load acting on the bolt through previously calculated stress-strain relationships. While this technique is most accurate, practical applications do not usually permit measurement of the stretch of the bolt and, in those instances where the stretch can be measured, it is a time consuming and relatively expensive technique. Accordingly, this technique is used in relatively few applications outside of laboratory testing.

Another known tightening technique that is comonly used in assembling the majority of joints involves the use of torque control tools, which indicate when the torque applied to the fastener equals or exceeds a predetermined value, and stopping tightening of the fastener in response thereto. Torque measurement is relatively easy and since torque is related to the axial force induced in the fastener assembly, and exerted on the structural members, the predetermined torque can be selected to theoretically correspond to the predetermined clamp load specified for the joint. However, when tightening threaded fasteners in an assembly line operation, wide variations in the actual torque-load relationship are experienced. These variations are caused by a variety of factors including allowable tolerence variations in the dimensions and strength of the fasteners and structural members, and lubrication or absence thereof on the mating surfaces of the fasteners and/or the structural members. All of these factors can cause large variations in the coefficient of friction between the mating surfaces of the fastener and the joint. In actual practice, variations of up to plus or minus 30% in the axial load on the bolts used for a particular application can be experienced at the same torque level. Accordingly, the torque control technique is not very accurate.

In an effort to overcome the problems associated with the prior art tightening systems, other tightening systems have been developed that include the use of tools measuring both the torque and angular displacement, or rotation, of a fastener during the tightening cycle. These tightening systems include control systems operative in response to the torque and angle measurements to determine when the slope of a torque-rotation curve for the fastener indicates that the yield point of the fastener has been reached and to then stop tightening the fastener. Neither the techniques nor the tools disclosed in the prior art patents are generally satisfactory for accomplishing the desired objective because they are not adaptive systems. That is, in each of the disclosed techniques it is necessary to know in advance either the torque-rotation relationship for the particular fastener being tightened or the torque gradient at the yield point. The torque-rotation relationship varies over a wide range for the same reasons that the torque-load relationships vary and, accordingly the techniques and tools disclosed in the prior art patents can be utilized only where the characteristics of the joint assembly are known in advance and average relationships must be predetermined and utilized in the operation of the tools. Thus the versatility and accuracy of the techniques and tools disclosed in the prior art patents are not fully satisfactory.

Another tightening system is disclosed in U.S. Pat. No. 3,782,419 "Apparatus For And Method Of Determining Rotational or Linear Stiffness" by John T. Boys. In this system, signals of both the torque applied and angular rotation of a fastener are provided during the tightening cycle in order to develop a signal indicative of the gradient of a curve which could be plotted for the two parameters. An instantaneous gradient signal is compared with a stored gradient signal and the tightening system is shut off in response thereto. The present invention is an improvement over the above-described system in that the present system does not require angular rotation signals obtained from the wrench means, as is disclosed in the above-identified application. The present control system utilizes a relatively inexpensive oscillator, which is not connected to the wrench means, for providing a second input parameter-time. Time signals are used, along with measured torque signals, in the gradient calculating portion of the control system to develop a gradient signal for controlling the operation of the present tightening system.

SUMMARY OF THE INVENTION

Accordingly, it is a general purpose and object of the present invention to provide a tightening system for accurately tightening a fastener system to its yield point or similarly significant point indicative of a significant change in slope on a curve plotted for various tightening characteristics and corresponding to a predetermined axial load.

It is yet another object of this invention to provide a tightening system for accurately tightening a fastener system to its yield point or similarly significant point indicative of a significant change in slope on a torque-time curve and corresponding to a predetermined axial load.

It is still another object of this invention to provide a tightening system for accurately tightening a fastener system to a predetermined axial load with minimum prior knowledge of the particular joint being assembled.

Finally, it is an object of this invention to provide a tightening system that is versatile, reliable, economical and accurate.

These and other objects of the present invention are accomplished by providing a tightening system including wrench means for applying torque to a fastener system associated with the joint being assembled. Associated with the wrench means are measuring means for developing a signal representative of the torque being applied to the fastener system. A signal representative of a constant incremental time is also developed and is fed along with the torque signal to gradient calculating means where a signal representative of the instantaneous gradient of a curve which could be plotted for the torque-time relationship of the particular fastener system being tightened is developed. The tightening system further includes means responsive to the instantaneous gradient signal for determining the yield point or other similar significant point indicative of a significant change in slope on the torque-time curve through which the fastener system is being tightened and for developing a control signal at that point.

BRIEF DESCRIPTION OF THE DRAWINGS

FIG. 1 is a plot of a curve illustrating the characteristics of a typical torque-time relationship experienced by a fastener during a tightening cycle illustrating the underlying principle of the invention; and FIG. 2 is a schematic drawing of an embodiment of a tightening and control system constructed in accordance with the present invention.

DESCRIPTION OF THE PREFERRED EMBODIMENT

Referring to FIG. 1, there is illustrated a typical torque-time curve for threaded fastener system being tightened, with torque plotted along the vertical axis and time plotted along the horizontal axis. The curve includes an initial or pretightening region extending from the intersection of the torque and time axes to point A which approximates the beginning of the generally linear portion of the curve. In the pretightening region, mating threads of the fastener assembly have been engaged and the fastener is being rotated, but the bearing face of the rotating fastener has not contacted the adjacent face of the structural member included in the joint. At approximately point A on the curve, the structural members have been pulled together by the fastener assembly and actual tightening of the joint commences. The torque at point A is commonly referred to in the art as the "snug" torque. In the tightening region of the curve, extending from point A to point B, which region is indicative of the axial force exerted by the fastener clamping the joint members together, the curve is generally linear. As will be more fully explained hereinafter, a point A′ may be selected which lies on the generally linear portion of the torque-time curve between point A and point B, and is the point in the tightening cycle at which the gradient calculating system is turned on. At point B, the limit of proportionality of the join assembly has been exceeded, and torque begins increasing at a slower rate than the corresponding increase in time. For purposes of this application, point B will be considered as the start of the yield region, but it should be understood that beyond point B, additional load is still induced in the joint assembly but at a non-linear rate of increase. Point C corresponds to the yield point of the joint assembly, and while the definition of the yield point varies slightly, it can be considered to be the point beyond which strain or stretch of the bolt is no longer purely elastic. As will become apparent, a tightening system in accordance with this invention is capable of detecting yield point C on the torque-time curve or other points between point B and point C in the yield region, and responding thereto to generate a control signal. In certain applications, points B and C may roughly correspond, but this correspondence would not affect the operation of the tightening system.

While in the preceding paragraph reference has been made to the limit of proportionality and yield point of the joint assembly, it should be noted that because of customary design criteria, these terms generally apply to characteristics of the fastener assembly and normally to the male fastener or bolt, since fastener assemblies are not usually as rigid as the structural members forming the joint assembly.

It should be understood that the present invention relates to a device that is capable of accurately detecting predetermined deviations from the generally linear portion of a torque-time curve, or curves of other parameters having similar shapes. It should be further understood that particular joint assemblies could include fastener systems constructed to cause the curve being plotted to deviate from linearity at some predetermined load other than the start of the material yield region. Such a deviation could be detected by the control system and used to generate a control signal. For this reason, the term yield point, as used herein, should be construed to include the yield point of the material from which the fastener is made, as well as points on a generally flattened portion of a torque-time curve generated by the configuration of the fastener at a predetermined clamping load.

Referring now to FIG. 2, there is illustrated an embodiment of a tightening system 10 in accordance with this invention. Tightening system 10 includes a wrench 12 having a motor 14, an output drive shaft 16 and a driver bit 18. Drive shaft 16 is driven by motor 14 to apply torque and impart rotation to a fastener member (not shown) engaged by driver bit 18. Wrench 12 may be any conventional type and, as is most common, motor 14 can be air powered with the flow of motive fluid being controlled by a suitable electrically operated solenoid control valve 20. It should be understood that motor 14 could also be electric, hydraulic or any combination of penumatic, hydraulic or electric. For purposes of simplification, it can further be assumed that the particular motor used has a substantially constant output speed for the tightening range being used. The exact details of the wrench are not necessary for a proper understanding of the invention and, accordingly, a more specific description is not provided.

Mounted between the housing of motor 14 and the rigid frame 22 on which the wrench is carried, is a suitable transducer or torque cell 24 for generating a varying signal representative of the instantaneous torque ($T_i$) being applied to the fastener. Torque cell 24 can be of any of a variety of conventional devices and in the embodiment disclosed herein comprises a somewhat flexible annular member having strain gauges 26 secured to its outer periphery so that the reaction torque on the wrench is measured and an electrical signal is generated. The reaction torque is equal to and opposite the torque being applied to the fastener, as is well known to those skilled in the art.

A control circuit is operatively connected to tightening system 10 for controlling the tightening of the fastener and includes a gradient calculating system that determines the instantaneous gradient or slope of the torque-time curve, which could be plotted on a graph, if desired, for the particular fastener system being tightened, and develops an electrical signal representative thereof. The gradient calculating system includes a clock or adjustable oscillator 34 which may be set to begin emitting signals ($t$) when motor 14 starts operating. The time interval between signals ($t$) is constant and is selected based upon the known output speed of the motor. Any speed within the range of output speeds of the motor can be selected as a basis for the period of signals ($t$). However, a preferred speed is one in the middle of the range of speeds of the characteristic speed vs. torque curve for the particular variable speed motor being used. Approximately 200 to 250 signals from clock 34 per each revolution of the motor output shaft, based on the free running motor speed, has been found to be an acceptable range. A shift register 36 receives instantaneous torque signals ($T_i$) from torque cell 24 and outputs respective torque signals clocked by the constant time interval signals ($t$) from clock 34. Accordingly, the output of shift register 36 is a signal representative of torque ($T_i$) a predetermined incremental time previous to the instantaneous time. A comparator 38, in the form of a suitable subtraction circuit, receives output signals ($T_t$) from shift register 36 and signals representative of instantaneous torque ($T_i$) from torque cell 24, and provides an output signal ($G_i$) representative of the difference therebetween. Since torque signals are subtracted over fixed increments of time, as previously described, the output signal from comparator 38 is representative of the instantaneous gradient ($G_i$) of the torque-time curve through which the fastener is being tightened.

At this point, it should be noted, that while the torque-time curve is generally linear from points A to B, this portion may be curved, so that a typical maximum gradient value would be reached in this region. Thus, the output of comparator 38, which would be a signal of constant magnitude if the torque-time curve were exactly linear from point A to point B, may experience certain changes. The gradient calculating system therefore includes circuits for determining and storing the maximum gradient ($G_{max}$) experienced up to any point along the torque-time curve, that is, up to any point in the tightening cycle. A storage circuit 40 is provided, which circuit stores signal representative of the maximum gradient ($G_{max}$) so far encountered, and a comparator 42 is provided for comparing instantaneous gradient signals ($G_i$) with the previously stored maximum gradient signal ($G_{max}$) from storage circuit 40. If an instantaneous gradient signal ($G_i$) is larger than a stored maximum gradient signal ($G_{max}$), the instantaneous gradient signal is then stored in storage circuit 40. For a fuller description of storage circuit 40 and comparator circuit 42, reference is made to U.S. Pat. No. 3,982,419 for Apparatus For And Method Of Determining Rotational Or Linear Stiffness by John T. Boys. The stored maximum gradient signal is then introduced into a division circuit 44 where a predetermined percentage of the stored maximum gradient signal ($G_{max}$) is obtained. For example, a value of two-thirds of the maximum gradient signal ($G_{max}$) may be selected. The selection of a two-thirds value has been found to be an acceptable value to insure that the fastener system has been tightened to its yield point. The selection of point C at approximately two-thirds of the maximum gradient value insures that noise or spurious signals generated during the generally linear portion of the torque-time curve will not cause a premature shut down of the tightening system. The proper selection of this shutoff point is important from a practical standpoint to insure that the yield point of the joint has been reached. It should further be noted that a range of 25 to 75% of the maximum gradient value has been found generally acceptable as a shut-off point. The shut-off value of the maximum gradient ($G_{max}$) is provided by division circuit 44 and fed into a comparator 46 where it is compared with the instantaneous gradient signal ($G_i$) from comparator 38. When the two signals are essentially equal, a control signal is issued from comparator 46 to solenoid valve 20 shutting off the flow of fluid to wrench 12 and stopping tightening of the fastener system.

Having thus described the preferred embodiment of the invention, some of the many advantages should now be readily apparent. The tightening and control systems described herein require minimum prior knownledge of the characteristics of a particular joint being tightened. The control system is completely adaptive to the tightening characteristics being experienced in each joint. The control system is relatively simple, economical and reliable, and accurately tightens each fastener system to its yield point.

While in the foregoing there have been disclosed an embodiment of a tightening and control system in accordance with the present invention, various changes and modifications should be readily apparent to one skilled in the art and are within the intended scope of the invention as recited in the claims.

What is claimed is:

1. Apparatus for tightening a threaded fastener system to a predetermined tightened condition comprising:
   means for applying torque to said fastener system;
   means for measuring the torque applied to said fastener system and providing a signal indicative thereof;
   means for developing a signal indicative of incremental time;
   gradient calculating means receiving said torque signals and said incremental time signals for developing a signal representative of the instantaneous torque gradient of the torque-time curve through which said fastener system is being tightened; and
   means responsive to said torque gradient signal for determining the yield point or other predetermined tightend condition on the torque-time curve through which the fastener system is being tightened and for developing a control signal when said fastener system is tightened to said point.

2. Apparatus for tightening a threaded fastener system in accordance with claim 1 wherein said means responsive to said torque gradient signal includes means for storing a signal representative of the torque gradient of the torque-time curve throughout the tightening region thereof and for developing said control signal when said instantaneous torque gradient signal is a predetermined percentage of said stored signal.

3. Apparatus for tightening a threaded fastener system in accordance with claim 2 wherein said stored signal is representative of the maximum torque gradient of said torque-time curve.

4. Apparatus for tightening a threaded fastener system in accordance with claim 3 wherein said control signal is developed when said instantaneous torque gradient signal is approximately two-thirds of said maximum torque gradient signal.

5. Apparatus for tightening a threaded fastener system in accordance with claim 3 wherein said control signal is developed when said instantaneous torque gradient signal is between approximately 25 to 75 percent of said maximum torque gradient signal.

6. Apparatus for tightening a threaded fastener system in accordance with claim 1 wherein each of said incremental time signals are developed at equally spaced time intervals.

7. A method of tightening a fastener system to a predetermined tightened condition comprising the steps of:
applying torque to said fastener system;
measuring the torque applied to said fastener system and providing a signal indicative thereof;
developing a signal indicative of incremental time;
developing a signal representative of the instantaneous torque gradient of the torque-time curve through which said fastener system is being tightened base upon said torque and said time signals; and
determining the yield point or other predetermined tightened condition on the torque-time curve through which the fastener system is being tightened, responsive to said torque gradient signal, and developing a control signal when said fastener system is tightened to said point.

8. A method of tightening a fastener system in accordance with claim 7 further comprising:
storing a signal representative of the torque gradient of the torque-time curve throughout the tightening region thereof; and
developing said control sigal when said instantaneous torque gradient signal is a predetermined percentage of said stored signal.

9. A method of tightening a fastener system in accordance with claim 8 wherein said stored signal is representative of the maximum torque gradient of said torque-time curve.

10. A method of tightening a fastener system in accordance with claim 9 wherein said control signal is developed when said instantaneous torque gradient signal is approximately 2/3 of said maximum torque gradient signal.

11. A method of tightening a fastener system in accordance with claim 9 wherein said control signal is developed when said instantaneous torque gradient signal is between approximately 25 to 75 percent of said maximum torque gradient signal.

12. A method of tightening a fastener system in accordance with claim 1 wherein each of said incremental time signals are developed at equally spaced time intervals.

* * * * *